United States Patent [19]
Locke et al.

[11] 3,808,553
[45] Apr. 30, 1974

[54] THERMALLY STABLE LASER RESONATOR SUPPORT ASSEMBLY

[75] Inventors: Edward V. Locke, Rockport; Jacob L. Zar, North Andover; Richard A. Hella, Andover, all of Mass.

[73] Assignee: Avco Corporation, Cincinnati, Ohio

[22] Filed: Nov. 21, 1972

[21] Appl. No.: 308,347

[52] U.S. Cl. ............... 331/94.5, 350/298, 350/310
[51] Int. Cl. .......................... H01s 3/02, H01s 3/04
[58] Field of Search ............ 331/94.5; 350/298, 310

[56] References Cited
UNITED STATES PATENTS
3,440,563  4/1969  Clement ............................ 331/94.5
3,641,454  2/1972  Krawetz ............................ 331/94.5
3,702,973  11/1972 Daugherty et al. ................ 331/94.5

OTHER PUBLICATIONS
"Compositron", Laser Focus, Vol. 4, No. 19, October, 1968, inside front cover
McManus, Laser Focus, Vol. 4, No. 9, May, 1968, pp. 21–23
Sylvania GTL, Laser Focus, Vol. 5,, No. 17, September, 1969, front cover.

Primary Examiner—Ronald L. Wibert
Assistant Examiner—R. J. Webster
Attorney, Agent, or Firm—Charles M. Hogan; Melvin E. Frederick

[57] ABSTRACT

The optical cavity in a laser system is defined by mirrors held in a predetermined spacial relationship that is maintained in spite of thermal gradients and temperature variations in the parts of the laser system which hold and support the mirrors. The relative spacial relationship of the mirrors to each other is maintained by a plurality of spacer rods which are made of a material which has relatively low thermal expansion and these spacer rods connect directly to the plates or blocks that carry the mirrors. Shields or enclosures for these bodies are made of a material which has a relatively high thermal conductivity and which does not in any way fix or limit the spacial relationship of the mirrors and so the temperature of the spacer rods remains sufficiently uniform that the thermal expansion thereof does not cause an excessive deviation in the spacial relationship of the mirrors in spite of changing thermal conditions and gradients throughout and about the laser system.

14 Claims, 14 Drawing Figures

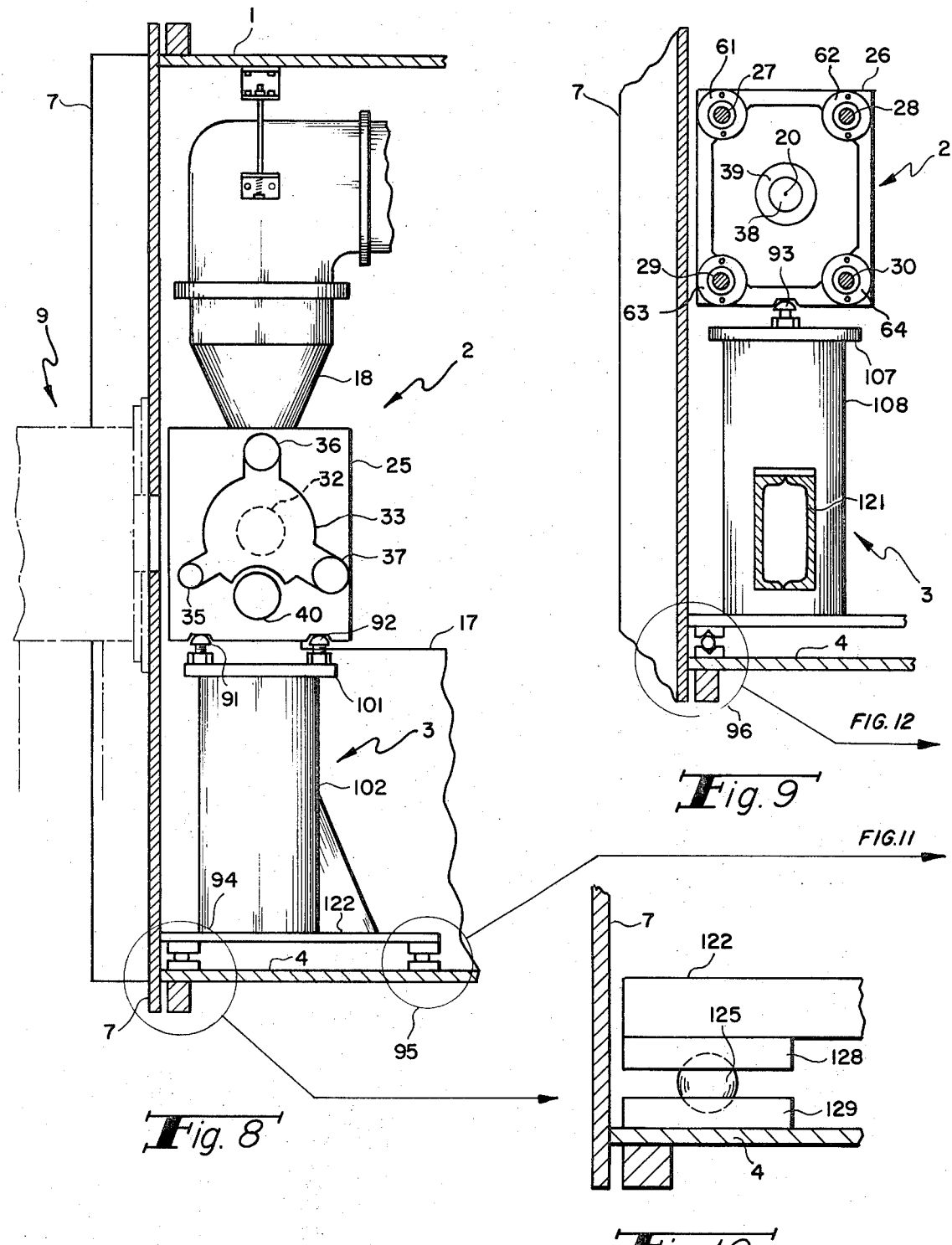

THERMALLY STABLE LASER RESONATOR SUPPORT ASSEMBLY

This invention relates to laser systems and more particularly to the mechanical structure of a laser system and the response of the mechanical structure to thermal conditions and gradients therein, whereby the spacial integrity of the laser cavity is maintained within prescribed limits in spite of thermal conditions throughout the system.

Two conditions required to bring about laser action (which is light amplification by the stimulated emission of radiation) in any laser system are: a population inversion of energy states in the medium in which the laser action takes place and an avalanche process of photon amplification in the medium which is established in a suitable optical cavity. Hence, it is usual in lasers to find the laser medium in which the population inversion is produced located in a resonant optical cavity or between mirrors which are maintained in a precise spacial relationship to each other. The laser medium may be a solid, liquid, gas or plasma. In some cases the interface between the solid or liquid medium and another medium provides reflective surfaces which function as mirrors and so define the resonant optical cavity, hereinafter called "optical cavity". For example, the optical cavity in semi-conductor lasers is often formed in this manner. And so, in these cases the dimensions of the laser medium itself defines the optical cavity. However, all gas and plasma lasers and many solid and liquid lasers use separate mirrors which are precisely aligned with respect to each other to define the optical cavity, and the laser medium is located along the optical axis between these mirrors. The present invention is directed particularly to structure for holding, spacing and supporting the mirrors which define an optical cavity in a laser system.

Some lasers and particularly high power gas lasers have relatively large dimensions and the spacing between the mirrors which define the optical cavity is on the order of several meters. For such large lasers, it is usually difficult to maintain the alignment of the mirror or mirrors at one end of the cavity with respect to the mirror or mirrors at the other end of the cavity. In lasers of this large size for example, the angular misalignment of the mirrors at opposite ends of the optical cavity must not exceed 100 microradians and, in some lasers, the optical angular orientation of the mirrors with respect to each other must be varied between 10 and 100 microradians to provide proper mode control of the laser radiation which is produced.

It is an object of the present invention to provide in a laser system means for reliably maintaining accurate alignment of the ends of the optical cavity in the system.

It is another object to provide means for supporting the mirrors which define the optical cavity in a laser system.

It is another object to provide structure for maintaining the spacial relationship between the mirrors which define the optical cavity in a laser system in spite of thermal conditions within and about the system structure.

It is a further object to provide such a structure for maintaining the said spacial relationship in a high power flowing gas type laser so that the angular misalignment of the mirrors with respect to each other does not exceed an acceptable limit.

It is another object of the present invention to provide means for supporting the optical cavity in a high power flowing gas type laser such that the effects of thermal expansion of the various parts of the support means on the angular alignment of the mirrors which form the optical cavity are minimized or avoided.

The various novel features that are considered characteristic of the present invention are represented in the embodiments of the invention that are described herein which represent the best known use of the invention.

The embodiment of the invention described herein is a high power flowing gas laser in which the gas is a mixture of $CO_2$, $N_2$ and He. This gas mixture flows into and out of the optical cavity of the laser in a direction generally transverse to the axis of the cavity. The flowing gas is irradiated in the cavity by a powerful electron beam directed along substantially the entire length of the optical cavity in a direction transverse to the optical cavity axis and transverse to the direction of flow of the gas. In operation, the gas flowing from the optical cavity is at a higher temperature then the gas entering and so the parts which form, define and support the optical cavity and which are in the path of the flowing gas are affected thermally by the temperature of the gas. These thermal affects influence the temperature of the various parts and produce temperature gradients and transient temperatures in the various parts that form the optical cavity and the support structure. In the embodiment of the present invention described herein, the spacial orientation of the mirrors at the end of the optical cavity with respect to each other is subject to two disturbing effects due to thermal gradients and overall temperature level changes which are brought about to a large part by the substantial temperature differential between the gas flow into and out of the laser cavity. For example, the optical length of the cavity which depends upon the dimensions of the mechanical structure which defines the cavity, is affected by the overall temperature of the parts. The temperature difference between different parts which define the optical cavity and/or temperature gradients in these parts results in an angular misalignment of the mirrors at the ends of the cavity. This angular misalignment or angular distortion, denoted $\theta$, (see FIG. 4) is the acute angle between the axis of one of the mirrors and the axis of the other mirror and is the measure of distortion of the optical cavity that is of most concern herein. The structure of the present invention whereby this parameter of distortion is maintained negligible or at least at a minimum, includes a plurality of spacer rods each attached rigidly to end plates or blocks that carry the mirrors. These spacer rods are of a material which exhibits relatively low thermal expansion and each rod is enclosed or shielded by a material which exhibits high thermal conductivity and is continguous with a heat sink such as a cooling fluid. Furthermore, the shields in no way mechnically limit or establish the spacial orientation of the end plates with respect to each other; that orientation is totally determined by the spacer rods. This structure is referred to herein as the optical strongbox.

The optical cavity (or strongbox) in the gas laser, structured as described above, is supported with respect to a mechanical ground or plane by a support structure from the mechanical ground or plane to the end plates. This support structure is such that neither longitudinal nor lateral expansions and contractions of the end plates and spacer rods are inhibited. This support is also self-aligning so that the direction of the optical axis of the laser cavity remains constant even in spite of longitudinal and lateral expansions of the end plates, the spacer rods and the support structure.

The support structure rests upon the mechanical ground in such a manner that there is no lateral shift of the support structure which would cause a lateral change in the position of the optical axis of the cavity with respect to the mechanical ground.

These and other features, objects and advantages of the present invention are apparent from the following description of the embodiment taken in conjunction with the drawings in which:

FIG. 8 is a partial end view of the flowing gas laser taken as shown in FIG. 1 showing some details of the three point support structure which supports the optical strongbox from the mechanical ground;

FIG. 9 is an end view of the other end of the flowing gas laser taken as shown in FIG. 1 showing the other end of the support structure;

FIGS. 10, 11 and 12 show details of the three support points of the support structure from the mechanical ground;

Figure 13:
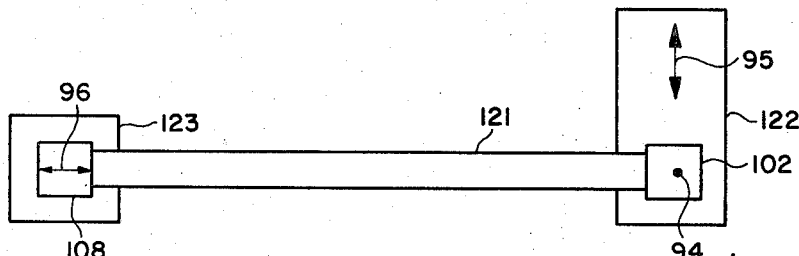
Figure 14:
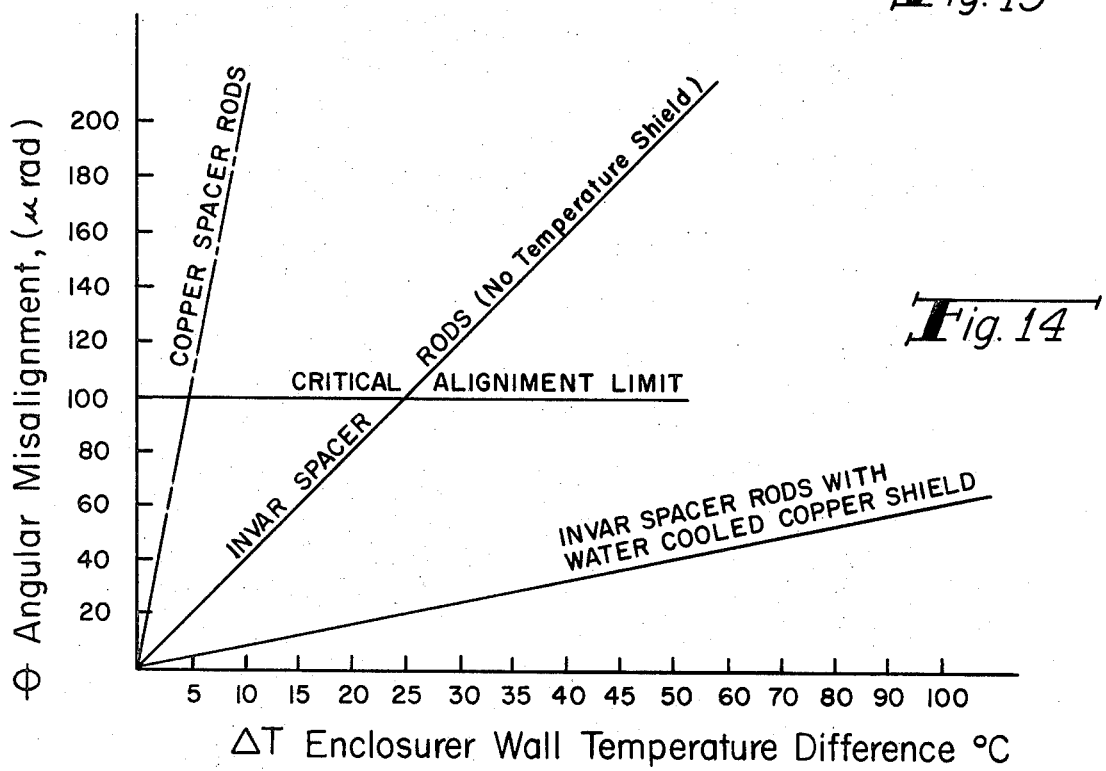

FIG. 13 is a top schematic plan of the three point support structure showing the relative permitted motions of the support points with respect to the mechanical ground; and FIG. 14 is a plot of angular misalignment, $\theta$, in microradians, versus the temperature difference between the downstream gas duct wall where the flowing gas leaves the optical cavity and the upstream gas duct wall, for a variety of structural conditions and illustrates some of the advantages of the invention.

Figure 1:
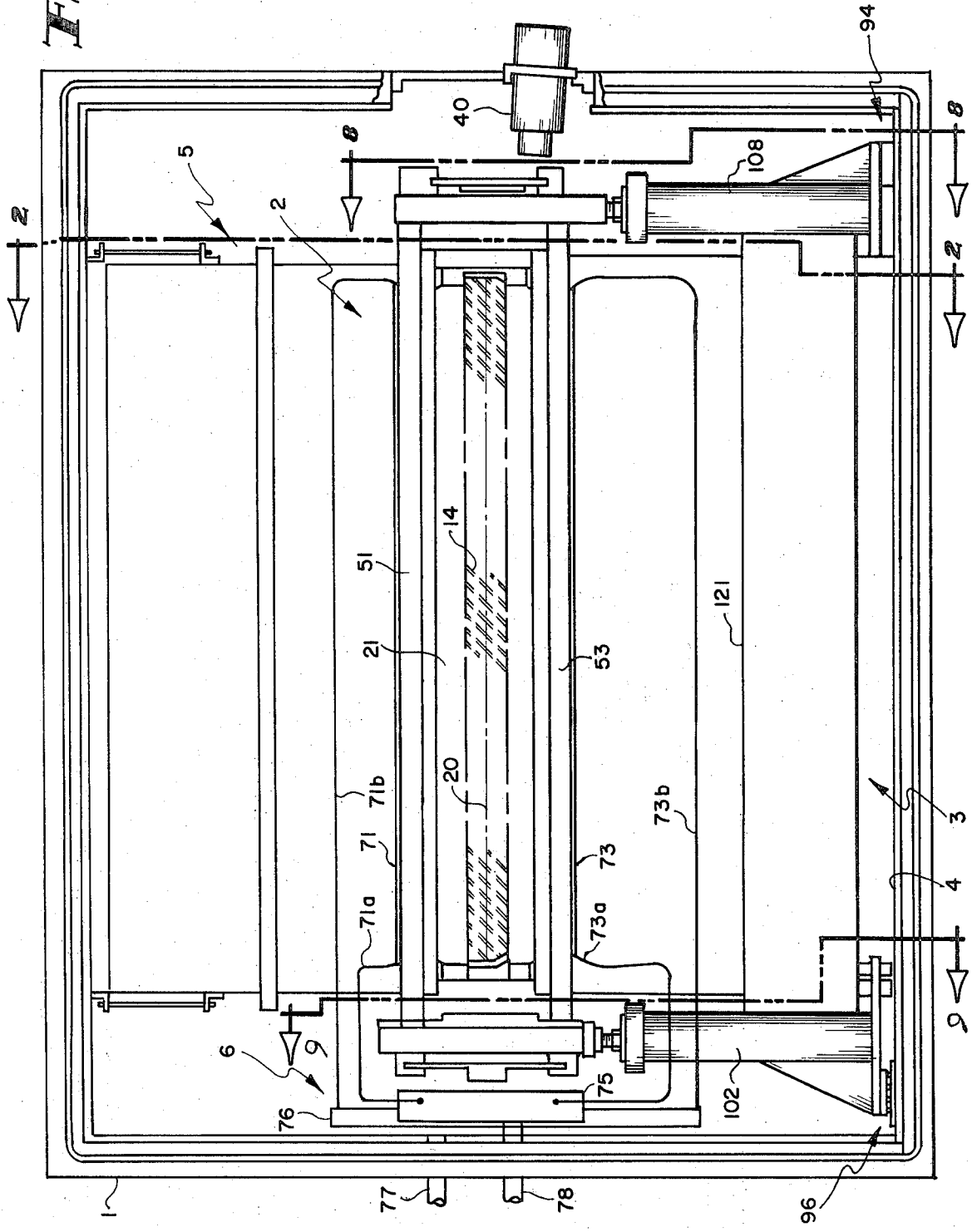
FIG. 1 is a side view of the optical cavity of the flowing gas laser showing the support structure and enclosure.
Figure 2:
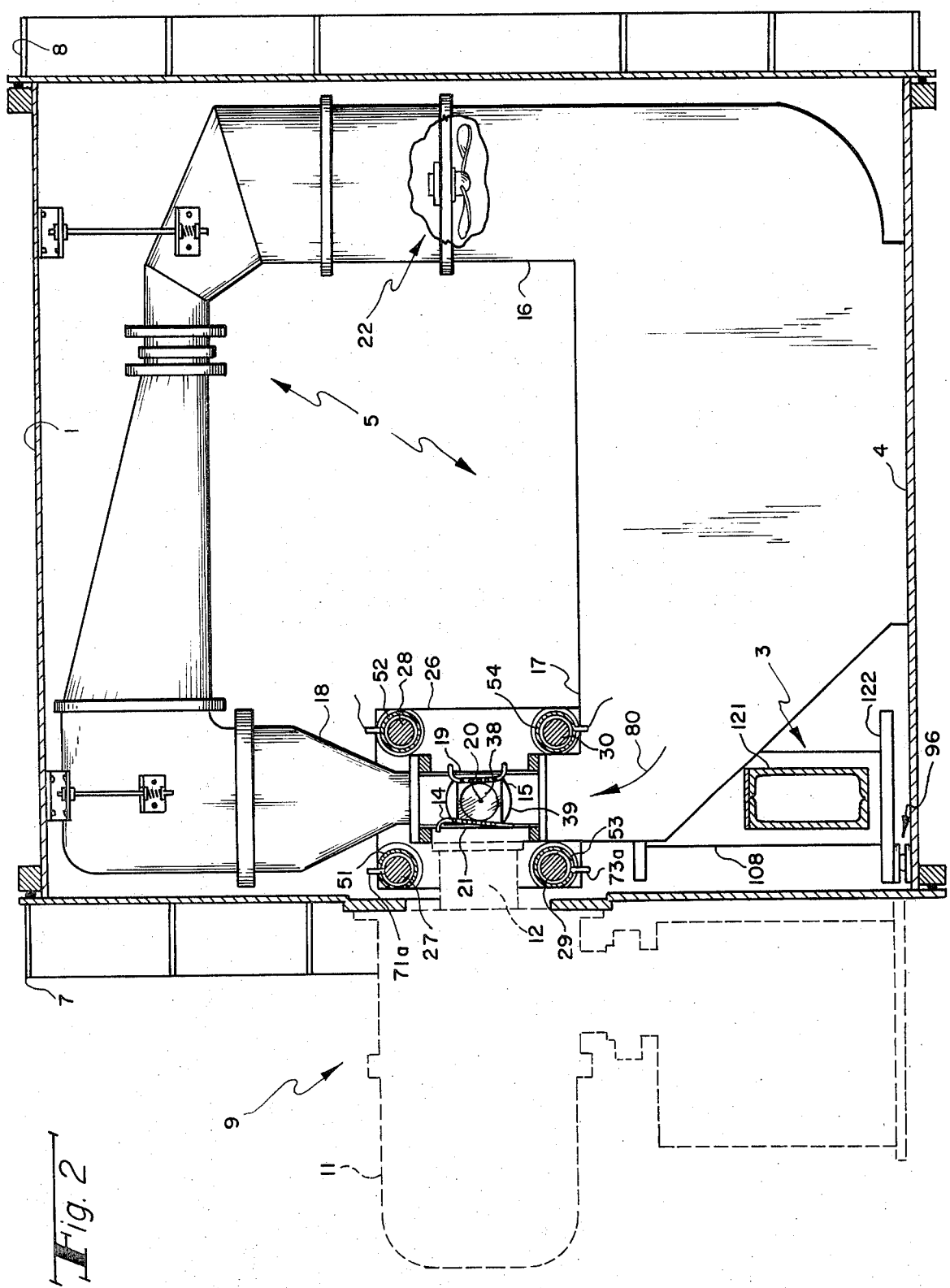
FIG. 2 is an end view of the same flowing gas laser taken in a direction parallel to the axis of the optical cavity and showing the support structure, gas duct system and power system for energizing the laser.

Turning first to FIGS. 1 and 2 there is shown a high power flowing gas laser system represented in sufficient detail to illustrate the various features of the present invention. These features relate principally to the optical cavity, herein called the optical strongbox, and the support structures for the optical strongbox, the gas flow system for providing a continuous flow of the gas mixture to the laser cavity and the cooling system for the spacer rod shields in the optical strongbox.

The particular embodiment of the invention illustrated in the figures provides a sealed enclosure for the optical strongbox, support structure and gas flow system. The energizing electron beam is launched into the optical cavity through an opening in this enclosure and the laser beam that is produced is directed from the optical cavity through a window in the enclosure. Some of the advantages of enclosing the structure in this manner are discussed herein.

Turning first to FIG. 1, there is shown an end view of the enclosure 1 which contains the optical strongbox 2 on the support structure 3 which rests on the bottom of the enclosure, referred to herein as the mechanical reference or ground 4. The gas flow system 5 is also contained in the enclosure as well as the liquid cooling system 6 for cooling the spacer rod temperature shields in the optical strongbox.

As shown in FIG. 2, the enclosure 1 opens at both ends. These ends are sealed closed by front and rear doors 7 and 8. The electron beam system 9 is carried on the front door and includes an external part 11 on the outside of the door and an internal part 12 on the inside of the door. The internal part 12 of the electron beam system launches an electron beam toward grid structures 14 and 15 located on each side of the optical axis 20 of the optical cavity which is held by the optical strongbox 2. The rear door 8 provides access to the rear of the enclosure occupied principally by the ducting 16 of the gas flow system 5. This ducting includes the inlet gas duct 17 and exhaust gas duct 18 which conduct the laser gas mixture into and out of the laser optical cavity. The gas flow is bounded within the optical cavity by wall 19 outside of grid 15 and by a foil wall 21 which is penetrated by the beam and located outside of grid 14. A gas blower 22 is located in the duct to compel a steady uniform flow of the laser gas through the optical cavity during operation of the laser system.

The apparatus and method of operation of a flowing gas laser of the type represented in FIGS. 1 and 2 is described in copending application Ser. No. 72,982 by J.D. Daugherty et al. filed Sept. 17, 1970, entitled Laser or Ozone Generator In Which A Broad Electron Beam With A Sustainer Field Produce A Large Area Uniform Discharge, now U.S. Pat. No. 3,702,973. In this type of flowing gas laser, the flowing gas in the optical cavity is irradiated by an electron beam to produce a volume distribution of secondary electrons in a gaseous medium in the optical cavity so that an electrical discharge between electrodes which are placed so that the discharge occurs in the optical cavity, is controlled. Thus, the electric discharge is through a sustained electric field across the cavity axis and this discharge is controlled by the volume distribution of secondary electrons in the gas which is, in turn, controlled by the irradiating electron beam. Thus, the discharge which produces the population inversion of energy states in the gas molecules or atoms is controlled and is very uniform as to both denisty and temperature of the medium along the entire length of the optical cavity. This apparatus and method of producing a controlled discharge in the gaseous medium is useful in the laser oscillator described herein and shown in FIGS. 1 and 2 and is useful also in a laser amplifier sometimes referred to as a master oscillator power amplifier (MOPA), because both of these include an optical cavity such as provided by the optical strongbox 2 shown in these figures.

Figure 3:
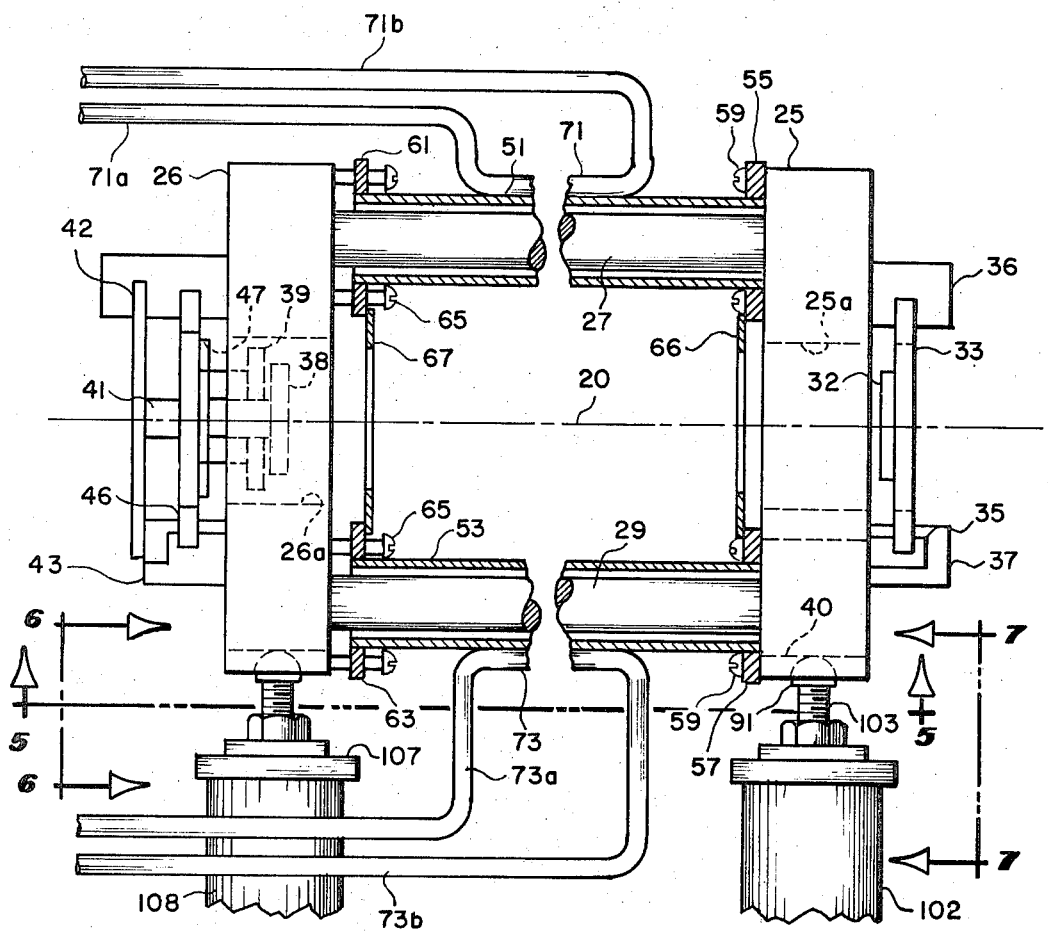
FIG. 3 is a side view of the optical cavity structure, referred to herein as the optical strongbox and a portion of the support pedestal upon which the optical strongbox rests.

The optical strongbox or laser cavity structure denoted 2 is shown in larger scale in FIG. 3. The dimensions of the optical cavity for a high power flowing gas laser are relatively large. For example, a $CO_2$-$N_2$-He gas mixture laser of this sort producing 10 kilowatts or more of continuous output radiation at 10.6 microns wavelength, has an optical cavity about 1½ meters long. The amount of heat dissipated in the operation of such a high power laser creates many problems and among these are the effects of this heat on the parts that define the optical cavity and which support the optical cavity. The thermal expansions and contractions of the parts which hold the optical cavity mirrors upset the angular alignment of the mirrors that form the cavity and introduce the angular distortion $\theta$ and shift the direction and position of the axis of the cavity with respect to a mechanical reference or ground.

The optical cavity or strongbox as it is referred to herein, includes two end plates 25 and 26 rigidly connected together by four spacer rods which are the two top spacer rods 27 and 28 and the two bottom spacer rods 29 and 30. The spacer rods 28 and 30 are concealed in FIG. 3 by rods 27 and 29. They are shown in FIGS. 2 and 9. Each of the end plates 25 and 26 includes an axial opening 25a and 26a respectively, along the laser axis 20 and each carries a mirror or mirrors along this axis. For example, plate 25 may carry a single mirror 32 fixed to a mirror plate 33 that is supported at three points on the plate from the end plate 25. The mirror plate 33 is pivotely supported at one point by the pivot 35 and is supported at two other points by the mirror plate positioning motors 36 and 37. These motors are carried on the end plate and adjust the tilt of the mirror plate 33, thereby adjusting the tilt of mirror 32 with respect to the cavity axis 20.

The other end plate 26 rigidly connected to end plate 25 by the spacer rods 27 to 30, may carry two mirrors, an inside mirror 38 which together with mirror 32 forms the optical cavity and an outside mirror 39 which directs laser radiation from the optical cavity through an opening 40 in plate 25 to an aerodynamic window system 41 mounted in the wall of the enclosure 1 just beyond plate 25. The construction and functioning of an aerodynamic window is set forth in application Ser. No. 249,607 by E. Hoag et al., filed May 2, 1972, entitled Aerodynamic Laser Window.

Each of the mirrors 38 and 39 is tilted with respect to the axis 20 in the same manner as the mirror 32; that is, each is held by a plate that is provided with a pivot point and two variable points, the variable points being varied by motors carried by end plate 26 and the pivot point being established by a pivot connection, also carried by end plate 26. For these purposes, mirror 38 is attached to mirror plate 42 held at pivot 43 and at positioning motors 44 and 45 that are carried on end plate 26. Similarly, mirror 39 is attached to mirror plate 46 held at pivot 47 and at positioning motors 48 and 49 that are carried on end plate 26. Thus, the angular alignment of each of the three mirrors with respect to the cavity axis 20 is adjustable. These mirrors are so shaped that when properly aligned, all laser radiation is reflected from mirror 32 to mirror 39 which focuses this laser radiation at a center point in the aerodynamic window system 40 for use outside the enclosure 1. The motor controls on the mirror plate 46 that carries mirror 39 center the output laser beam in the aerodynamic window system 40 and these motors may be remotely controlled in response to detectors in the aerodynamic window to accomplish the centering.

The laser cavity or strongbox optical system described above and shown in FIG. 3 is but one example of an arrangement of mirrors and mechanisms for positioning the mirrors, all carried by the end plates 25 and 26. Clearly, other arrangements of mirrors and mechanisms for positioning the mirrors all carried on the end plates could be substituted depending upon the intended use of the laser radiation, the gaseous medium and the manner of energizing the laser. The optical system described herein is described only by way of example and other optical systems and controls could be substituted by those skilled in the art.

The principal features of the present invention relate not to the optical system itself, but the strongbox which includes the end plates 25 and 26, spacer rods 27 to 30 which rigidly connect these end plates and the support structure 3 which carries all this on the mechanical reference or ground 4 which is the floor of the enclosure 1.

Ideally, the spacer rods 27 to 30 should be made of a material which has a very low thermal coefficient of expansion and, further, the material should be a good thermal conductor. Having both these characteristics, each spacer rod would quickly stabilize at a constant uniform temperature and the expansion or contraction of each rod due to temperature variations would be a minimum. Clearly, both these characteristics, low thermal expansion and high conductivity can not be found in any single material. For example, in the category of low expansion coefficient materials, there is invar steel which has a relatively low expansion coefficient, but invar steel also has a rather low thermal conductivity. Hence, if the end plates and the spacer rods are all made of invar steel, the optical strongbox will resist expansions due to small differences in temperature. However, if one part of the strongbox made of invar steel were heated by radiation from a neighboring hot element or were heated by flowing gas substantially more than other parts of the strongbox, the low thermal conductivity of invar steel would eventually result in large temperature differences. If, on the other hand, a high thermal conductivity material such as copper were used, the temperature difference from one point to another in the optical strongbox would be quite small, but the high thermal expansion of copper even for small temperature differences would result in a significant distortion of the strongbox. In accordance with features of the present invention, the optical strongbox is constructed so as to combine the desired properties of a material such as invar steel which exhibits low thermal expansion and a material such as copper which exhibits high thermal conductivity.

The optical strongbox structure is shown principally in FIG. 3. Here, the spacer rods 27 to 30 are made of a material such as invar steel which has very low thermal expansion. The rods 27 and 30 are enclosed in a copper jacket or shield denoted 51 to 54, respectively, and each jacket is fixedly attached to only one of the end plates 25 or 26. The jackets 52 and 54 enclosing rods 28 and 30 are shown in FIG. 9. It is convenient to attach all of these jackets directly to the end plate 25 by securing the flanges 55 to 58 at the ends of each of the jackets 51 to 54, respectively, to the end plate 25 by attachment screws 59. The other end of each jacket is equipped with a flange slideably supported from end plate 26 so that longitudinal expansions of the jackets in no manner imposes any mechanical forces or restrictions between the end plates 25 and 26 and so the positioning of the end plates with respect to each other is totally determined by the spacer rods. The flanges 61 to 64 at the ends of jackets 51 to 54 are equipped to slide on support pins 65 fastened to the end plate 26 and so the jackets are supported and can expand and contract freely without distorting the strongbox.

Additional shields may be provided for the end plates 25 and 26 to shield these plates from the high temperature area of the laser which is usually along the laser axis 20. For this purpose copper shields 66 and 67 are provided to substantially cover the surfaces of the end plates which are exposed to the optical cavity. The end plate shields 66 and 67 may be carried on the flanges at the ends of the jackets 51 to 54 that enclose the spacer rods and each end plate shield has an opening along the axis 20 sufficiently large so as not to block the radiation between the mirrors carried by the end plates. Thus, the high temperature areas of the laser as well as parts of the strongbox subject to heat radiated by the ducts through which the laser gaseous medium flows are all shielded by copper to minimize temperature gradients.

In addition, the jackets 51 to 54 enclosing the spacer rods are each cooled by a liquid coolant carried in cooling tubes attached to each jacket. Two of these cooling tubes are shown in FIG. 3. One tube 71 is attached to jacket 51 and another, 73 is attached to jacket 53. The ends of these tubes 71a and 71b and 73a and 73b connect to coolant input and output manifolds 75 and 76, respectively, which may be located inside the laser enclosure 1. Pipes 77 and 78 extend from these manifolds through the enclosure wall for connection to a coolant pump and a source of coolant fluid. The input flow of coolant fluid through each of the coils 71 to 74 in contact with jackets 51 to 54, respectively, is preferrably at the same end of the jackets so that whatever may be the diminished effect of the coolant along the jacket, it is in the same direction along all of the jackets. Clearly, the coolant tends to stabilize the temperature of the spacer rod jackets 51 to 54 and also tends to stabilize the temperatures of the shields 66 and 67 which are in direct thermal contact with the spacer rod jackets and so all the copper shielding on the inside of the optical strongbox is, in effect, liquid cooled.

In operation, the temperature of all the copper shielding becomes quite uniform and so the temperature of the end plates 25 and 26 and the spacer rods 27 to 30 also become quite uniform even in spite of a substantial temperature differential between the entering and leaving laser gas medium. If the spacer rods and end plates are all made of invar steel or of some other material which exhibits low thermal expansion, there will be a minimum expansion of these parts and so there will be a minimum of angular misalignment, $\theta$, of the mirrors carried on the end plates.

Figure 4:
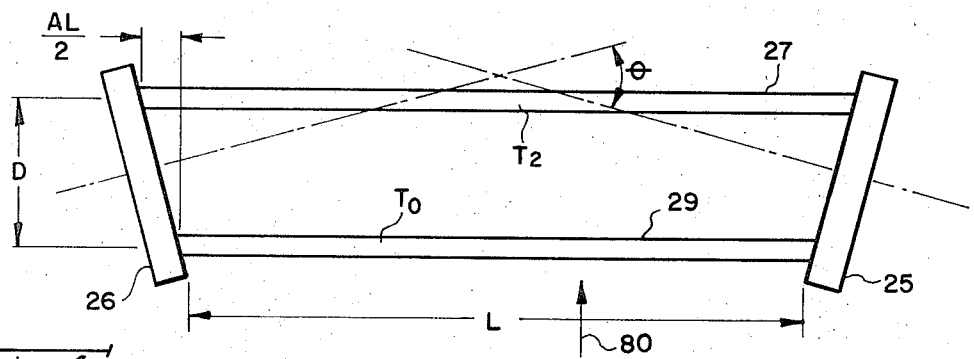
FIG. 4 is a schematic mechanical representation of the optical strongbox illustrating by exaggeration the parameter of distortion $\theta$, brought about when the spacer rods expand to different lengths.

The distortion parameter, $\theta$, is illustrated in FIG. 4 which is a simplified representation of the optical strongbox without jackets or shields as viewed from the side. The laser gas medium flows in the duct defined by walls 19 and 21 in the optical strongbox in the direction of arrow 80 and so the walls of this duct immediately adjacent the upper rwo rods 27 and 28 are at a substantially higher temperature than the walls of this duct immediately adjacent the lower two spacer rods 29 and 30. As a result of this, there is an uneven expansion of the spacer rods, the length L of the upper rods 27 and 28 is increased an amount $\Delta L$ and, as a result of the greater expansion of these upper two spacer rods, an angular misalignment, $\theta$, of the mirrors which define the optical cavity occurs. The magnitude of this misalignment is $$\theta = \Delta L/D \tag{1}$$

But $$\Delta L = La\Delta T_2, \quad \theta = La\Delta T_2/D \tag{2}$$

where $a$ is the expansion coefficient of the invar rods, and $\Delta T_2 = T_2 - T_0$, where $T_0$ is the temperature of the end plates 25 and 26 and $T_2$ is the temperature of the upper two rods 27 and 28.

The magnitude of $T_2$ may be estimated by equating the power radiated to the rods from the hot gas flow duct walls, to the power conducted out of the rods to the end plates due to $\Delta T_2$ between the rods and the end plates.

The net radiated power into the rods is $$P_{in} = e_1 e_2 \sigma (T_1^4 - T_2^4) dL \tag{3}$$

where $T_1$ is the temperature of the gas flow duct immediately adjacent the upper two rods 27 and 28, $e_1$ and $e_2$ are the emissitivities of the wall and the rod, respectively, and $\sigma$ is the Stephen Boltzmann constant.

The power lost from the rods is $$P_{out} = 2k\, d^2 \Delta T_2/L \tag{4}$$

where $k$ is the thermal conductivity of the rods.

A steady state condition is reached when the rod becomes hot enough to conduct away as much heat as is radiated to it. Thus $$e_1 e_2 \sigma (T_1^4 - T_2^4) dL = 2Kd^2 \Delta T_2/L \tag{5}$$

Solving this equation under the assumption that both $\Delta T$, and $\Delta T_2$ are small compared with $T_0$ gives $$\Delta T_2 = \left[ \frac{2\sigma T_0^3 dL e_1 e_2}{\dfrac{kd^2}{L} + 2\sigma T_0^3 dL e_1 e_2} \right] \Delta T_1 \tag{6}$$

Substituting Eq. 6 into Eq. 2, and solving for $e_1$ and $e_2 = 1$, and the conditions appropriate to the laser, for example, ($L = 150$ cm, $d = 5$ cm), and the constants for invar ($K = 0.5$ w/cm°C, and $a = 10^{-6}$/°C) gives the line shown in the graph of FIG. 14 labeled "Invar Spacer Rods (no temperature shield)". It is seen that, for a gas flow duct wall temperature of about 50°C, the angular misalignment $\theta$ greatly exceeds the allowable misalignment limit empirically determined for the laser and shown by the line labeled "Critical Alignment Limit". Indeed, it has been observed that the power output from this laser without jackets or shields on the rods begins to decrease after the walls become hot.

If the rods were made of copper instead of invar, the misalignment would be much worse, as can also be seen from FIG. 14. However, if copper jackets are placed around the invar rods in accordance with the present invention, a similar analysis shows that the invar temperature rises only $$\Delta T_2 = \left[ \frac{2\sigma T_0{}^3 dL e_1 e_2}{\frac{k\delta L}{2d} + 2\sigma T_0{}^3 dL e_1 e_2} \right] \Delta T_1 \qquad (7)$$

where $\delta$ is the wall thickness of the copper jackets.

The resulting decreased distortion can be seen in FIG. 14 by the line labeled "Invar Spacer Rods with Walter Cooled Copper Shield". This structure constructed and supported as described herein will operate at steady state conditions which may result in gas flow duct wall temperatures as high as 100°C. and operation at this condition for several hours does not result in any decrease in output laser power.

Turning next to FIGS. 5 to 13 there is shown various details of the support structure 3 that supports the optical strongbox 2 from the mechanical ground 4 at the floor of the enclosure 1. The end plates 25 and 26 of the optical strongbox rest upon support pads 91 to 93 and so the strongbox is supported at three points. The support structure 3 also contacts the mechanical ground 4 and is supported on the mechanical ground at the three points, denoted 94 to 96 which are described in detail with reference to FIGS. 9 to 13.

Figure 5:
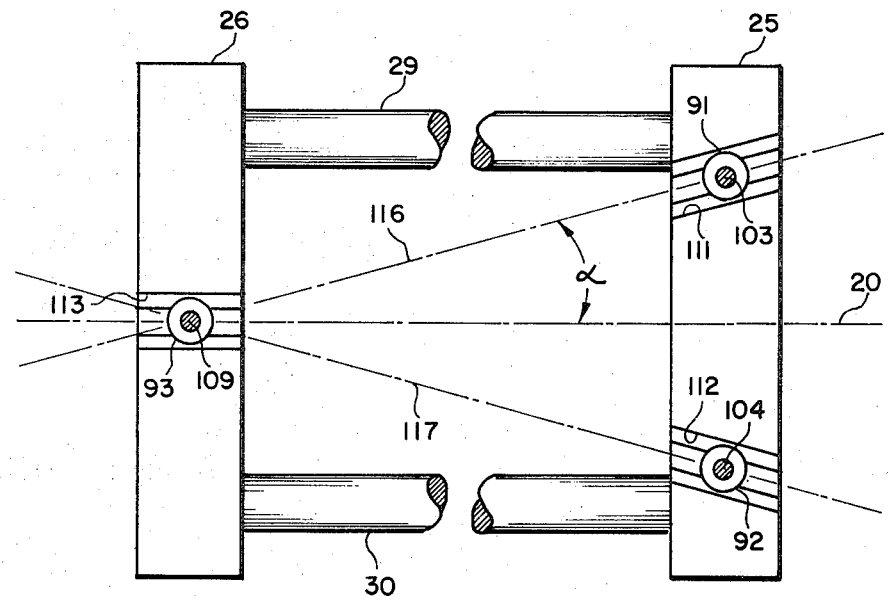
FIG. 5 is a bottom view of the optical strongbox showing the pads supported by the support pedestals upon which the strongbox end plates rest.
Figure 6:
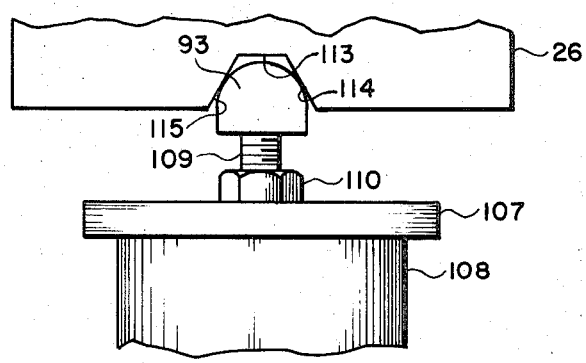
FIGS. 6 and 7 are end views of the optical strongbox showing details of the pad structure attached to the pedestals upon which the optical strongbox rests.
Figure 7:
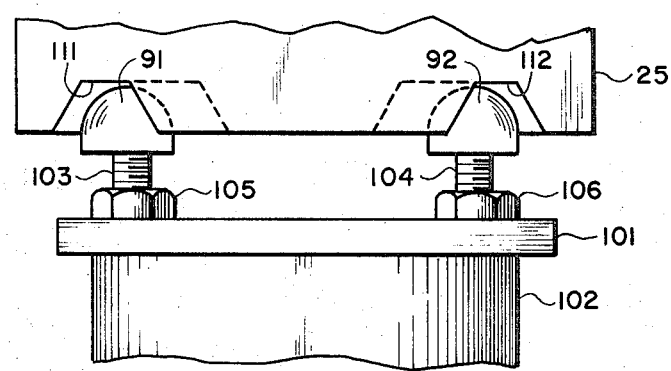

As shown in FIGS. 5 to 7, support pads 91 to 93 are rounded mushroom-shaped steel pads, each of which contacts an accomodating specially shaped groove or channel in the bottom of an end plate. The two pads 91 and 92 are spaced apart on a plate 101 fixed to top of pedestal 102 of the support structure 3. The height of these pads is adjustable by the threaded engagement of the pad shafts 103 and 104 with nuts 105 and 106, respectively, fixed to the plate 101. Similarly, pad 93 is attached to plate 107 at the top of pedestal 108 of the support structure 3 and the height of this pad is adjustable by the threaded connection of the pad shaft 109 with the nut 110 fixed to plate 107.

The rounded surfaces of the pads 91 and 92 engage the angled grooves 111 and 112, respectively, in the bottom of end plate 25. The rounded end of pad 93 contacts a similar groove 113 in the bottom of end plate 26. Each of the grooves such as groove 113, includes two slanted surfaces such as 114 and 115 which are contacted by the rounded end of the pad and so each pad contacts its associated groove at two points in the groove.

The angled grooves 111 and 112 are directed along lines 116 and 117 respectively, which cross a vertical plane through the laser axis 20 at the same point and the point of crossing preferably lies between the two end plates 25 and 26. The angle each of these lines make with that plane is denoted $\beta$. The direction of the groove 113 at the bottom of plate 26 lies in that same plane and is parallel to the axis 20 of the laser cavity.

Presuming for a moment that the three pads 91 to 93 are fixed with respect to the mechanical ground 4, then the grooves and pads for supporting the strongbox function as follows. Any expansion of the spacer rods 27 to 30 causes end plate 26 to slide along the axis 20 on the pad 93 and so the optical axis 20 of the cavity remains along the same ray with respect to the pads and with respect to the mechanical ground. Lateral expansion of end plate 26 in no way upsets this condition. Lateral expansion of the end plate 25 causes the distance between grooves 111 and 112 to increase. However, this change in distance between grooves does not displace the alignment of plate 25 with the optical axis 20, because the grooves are angled equally as shown. The angled grooves cause the end plate 25 to move along the axis 20 in response to lateral expansion thereof and this movement along the axis 20 is not accompanied by any twisting of end plate 25. Thus, a three point support of the optical strongbox 2 on the support structure 3 is achieved and is such that neither uniform longitudinal nor lateral expansions of the parts of the optical strongbox result in a change in direction or a lateral displacement of the optical axis 20 with respect to the pads. More particularly, these expansions and contractions do not alter the direction or position of the optical axis 20 with respect to the support pads 91 to 93. However, unequal longitudinal expansions of the spacer rods result in an angular misalignment $\theta$, as already described above and explained with reference to FIGS. 3 and 4. This misalignment is minimized as described herein with reference to those figures.

The support structure 3 which carries the three pads on pedestals 102 and 108, as already described, includes a massive longitudinal support member 121 as shown in FIGS. 1, 2, 9 and 13 which rigidly connects the two pedestals. The base plate 122 attached to the bottom of pedestal 102 connects to the support points 94 and 95 that support structure 3 from the mechanical ground 4. Another base plate 123 attached to the bottom of pedestal 108 connects to the other support point 96. These support points are also represented in the diagram of FIG. 13.

Figure 11:
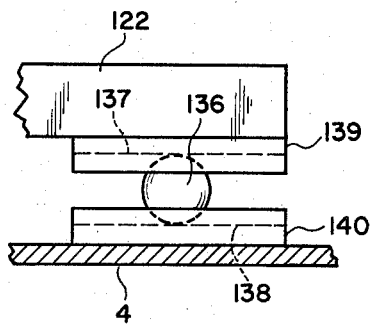
Figure 12:
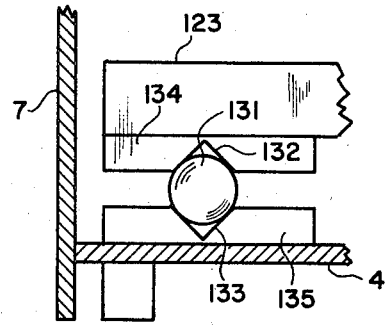

Enlarged views of the support points 94 to 96 for the structure 3 are shown in FIGS. 10 to 12 respectively. The contact to the mechanical ground is made at each of these support points by a steel ball. At one point, 94, both longitudinal and lateral motion of the structure 3 with respect to the mechanical ground 4 is prevented, because the ball can not roll in either of these directions. On the other hand, at the point 95 the ball can roll in the lateral direction and at point 96 the ball can roll in the longitudinal direction. These conditions are illustrated in FIG. 13.

At point 94, as shown in FIG. 10, the ball 125 is captured between dimples 126 and 127 in pads 128 and 129 attached, respectively, to the pedestal base plate 122 and the mechanical ground 4. At support point 96 shown in FIG. 12, the ball 131 is contained in longitudinal grooves 132 and 133 in pads 134 and 135, respectively, attached to pedestal base plate 123 and the mechanical ground 4. Similarly, at point 95, the ball 136 rolls in lateral grooves 137 and 138 in pads 139 and 140, respectively, attached to the base plate 122 and the mechanical ground 4.

The functioning and advantages of the support structure 3 and the points of support from the mechanical ground can be seen from FIG. 13. Any expansion or contraction of the massive structural member 121 which connects the pedestals moves only the pedestal 108 in a longitudinal direction with respect to the mechanical ground and this causes the support pad 93 to move within its groove at the bottom of end plate 26 without moving the end plate or disturbing the optical strongbox. This longitudinal expansion of member 121 does not twist or distort the support structure 3, because the expansion is not impeded. Any lateral expansion of the pedestal 102 and the plate 101 at the top of this pedestal which would cause the pads 91 and 92 to move away from each other, causes the whole optical strongbox to move slightly along the axis 20 due to the angular orientation of the grooves in the bottom of end plate 25 in which these pads ride. Lateral expansion of the pedestal base plate 122 at the bottom of pedestal 102 is permitted at support point 95 and so those expansions are relieved without shifting the position of pedestal 102 in a lateral direction with respect to the mechanical ground.

The various features and advantages of the present invention shown in the particular embodiment described herein are specifically adapted for that embodiment which is a high power flowing gas laser energized as described by electron beam irradiation and an electrical discharge. This structure includes the optical strongbox which carries the mirrors that form the laser optical cavity and the claims appended hereto relate to the structure of that optical strongbox and are not specifically limited to the particular type of flowing gas laser described herein nor to the manner of energizing the laser. Clearly, the features and advantages relating to the construction and the use of the optical strongbox described herein could be adapted by those skilled in the art for other uses in laser or maser systems.

Features of the support structure which supports the optical strongbox from a mechanical ground or reference have certain advantages in the laser system described in the embodiment which combine with the advantages of the optical strongbox to provide a total platform for carrying the mirrors of the laser system. By virtue of these features, those thermal expansions and contractions which would upset the positioning of the mirrors with respect to each other and/or with respect to the mechanical ground, are minimized or avoided. While this support structure, in conjunction with the optical strongbox as described herein is adapted for a high power flowing gas laser energized as described, it should be apparent to those skilled in the art that this support structure could be used in other laser systems as well.

What is claimed is:

1. In a laser system, having a resonant optical cavity formed by mirrors, said optical cavity having an optical axis, means for holding said mirrors in spacial relationship comprising in combination, a plurality of spacer bodies, the dimensions of which define said spacial relationship between the mirrors, heat shielding means which does not mechanically define said spacial relationship enclosing said spacer bodies for minimizing thermal gradients in said spacer bodies, heat sink means in substantial thermal contact with said shielding means for removing heat therefrom, whereby the temperature of said spacer bodies remains sufficiently uniform that the thermal expansions and contractions thereof do not cause an excessive deviation in the spacial relationship of the mirrors, and first and second end blocks, said mirrors being attached to said end blocks, said spacer bodies are each attached to said end blocks holding them in spacial relationship, and said heat shielding means is fixedly connected to only one of the end blocks.

2. In a laser system as in claim 1 wherein,
the heat shielding means for the spacer bodies includes a separate shield enclosing each of the spacer bodies.

3. In a laser system as in claim 2 wherein,
each of the separate shielding means is fixedly connected to only one of the end blocks.

4. In a laser system as in claim 1 additionally comprising,
a base member defining a mechanical reference plane, and support structure means for supporting said end blocks, said support structure means being carried by said base member and said end blocks being carried by said support structure means whereby only said first end block is moveable with respect to said reference plane in the direction of said optical axis, and said heat shielding means is fixedly attached to said second end block.

5. In a laser system as in claim 1 wherein:
there are at least three spacer bodies.

6. In a laser system as in claim 1 wherein,
there are four spacer bodies each having a longitudinal axis and each oriented with the longitudinal axis thereof substantially parallel to said optical axis and spaced from each other to permit direct access to the optical cavity from at least two opposite sides thereof.

7. In a laser system as in claim 6 wherein,
means are provided for directing energy to the optical cavity from one side thereof between spacer bodies and
means are provided for directing the laser gas medium through the optical cavity, said gas entering from one of two said opposite sides and leaving from the other of said two opposite sides.

8. In a laser system as in claim 1 wherein,
the spacer bodies are composed of a material selected for its relatively low thermal expansion and the heat shielding means is composed of a material selected for its relatively high thermal conductivity.

9. In a laser system as in claim 1 wherein,
the means in thermal contact with the heat shielding means includes a coolant fluid and means for conducting said fluid against the heat shielding means.

10. In a laser system as in claim 8 wherein,
the material selected for its relatively low thermal expansion is invar steel.

11. In a laser system as in claim 8 wherein,
the material selected for its relatively high conductivity is copper.

12. In a laser system including a structure having a bottom and opposed ends for supporting mirrors which form a resonant optical cavity having an optical axis in the system,
means for supporting said structure with respect to a mechanical reference plane comprising in combination,
first means defining two grooves at one end of the structure, said grooves being directed along lines that cross at a point lying in a vertical plane passing through the optical axis and which make equal angles with respect thereto, second means defining another groove at the other end of said structure said groove being directed along a line which lies in said plane, and three supports each of which contacts a different one of said grooves and upon which the structure moveably rests, whereby longitudinal expansions and contractions of the structure which are parallel to the optical axis and lateral expansions and contractions of the structure which are transverse to the direction of the optical axis cause said structure to move on said supports without substantial changes in the direction of the optical cavity with respect to the supports.

13. In a laser system as in claim 12 wherein, the grooves open at the bottom of the structure and the supports are upstanding rounded pads which fit in the grooves.

14. In a laser system as in claim 12 wherein, the groove lines crossing point is within the length of the optical cavity.

* * * * *